T. P. Thompson,
Filter.
No. 102,881.  Patented May 10, 1870.
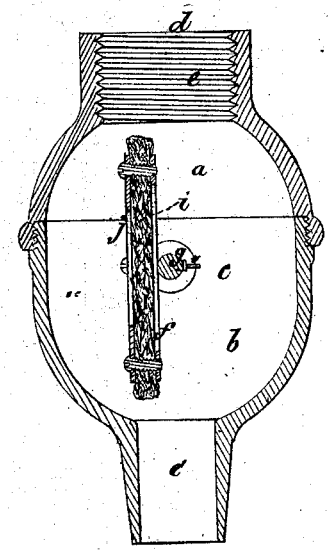
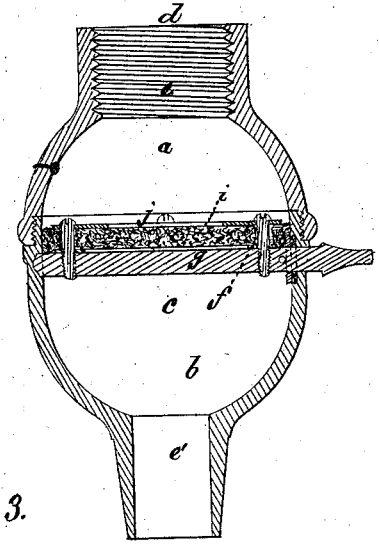
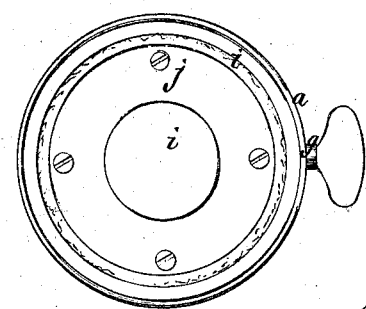
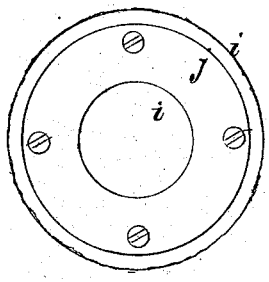
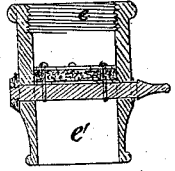
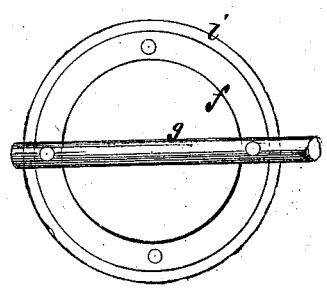
Witnesses.
Geo. A. Loring
Edward Griffith
T. P. Thompson.
by his Attorney.
Frederick Curtis.

United States Patent Office.

TAYLOR P. THOMPSON, OF CHARLESTOWN, MASSACHUSETTS, ASSIGNOR TO HIMSELF AND LEWIS R. BRADBURY, OF SAME PLACE.

Letters Patent No. 102,881, dated May 10, 1870.

IMPROVEMENT IN FILTERS.

The Schedule referred to in these Letters Patent and making part of the same

*To all to whom these presents shall come:*

Be it known that I, TAYLOR P. THOMPSON, of Charlestown, in the county of Middlesex and State of Massachusetts, have made an invention of a new and useful Filter for Straining Liquids; and do hereby declare the following to be a full, clear, and exact description thereof, due reference being had to the accompanying drawings making part of this specification, and in which—

Figures 1 and 2 represent vertical sections of my invention, and

Figure 3, a horizontal section of the same, taken through the shaft of the filtering diaphragm.

Figures 4 and 5 are opposite side views of the said diaphragm and its supports.

The object of this invention is to produce, at small cost, an effective filter for different liquids, but more especially water.

And such invention consists in the employment of two semispherical cups, joined together at their circumference by a male and female screw or otherwise, the crown or center of each cup being prolonged into a tubular extension, one of which is formed with a female-screw, for attachment to a faucet or other connection, and the other serving as an outlet or discharge-port, a tilting or swiveling porous disk being situated and confined between the two cups in such manner as to be reversed and present alternate sides to the inrushing liquid, essentially as hereinafter explained.

In the drawings, hereinbefore mentioned as making part of this specification—

*a* and *b* denote two semispherical cups, the peripheries of which are provided alternately with a male and female-screw, by which they are firmly connected together, in order to create a filtering-chamber, *c*, the upper cup being formed with an integral tubular extension, *d*, in the interior of which is produced a female-screw, *e*, in order that the instrument may be attached to a faucet, pipe, or other connection, while the lower cup has a similar extension, *e'*, to permit of escape of liquid passing through the filter.

Within the center of the filtering-chamber *c* I dispose a horizontal flat ring, *f*, mounted upon a shaft, *g*, which passes through one side of one cup, spans the interior of the chamber *c*, and is stepped in the opposite side thereof, as shown at *h* in the drawings, the outer and exposed end of said shaft being provided with a milled head, or its equivalent, in order to partially or entirely revolve such shaft within its bearings.

Upon one face of the ring *f* I place the filtering agent *i*, which, in the present instance, is a piece of thick felt, and upon such agent I screw a second flat ring, *j*, thus confining said medium between the two rings.

The size of the filtering agent is such as to tightly fill the interior of the device in horizontal section, and it may be freely revolved without danger.

The above simple arrangement constitutes the subject-matter of my invention as embodied in this context.

The liquid entering the instrument through the orifice *d* percolates or is forced through the interposed porous diaphragm *i*, which arrests any dirt or extraneous matter which may reach it.

After continued flowage of liquid through the diaphragm *i* has been continued for some time, it is to be inverted or reversed, and the opposite side presented to the inrushing water, the dirt, which may have collected upon it by this means, being detached and suffered to escape through the outlet *e'*, the milled head of the shaft *g* enabling the rotation of such shaft, and, consequently, of the filtering diaphragm, to be effected readily and easily, and without necessity of dismembering the instrument or detaching it from its connections.

Should liquid be passing through the chamber *c*, which it is not necessary or desirable to filter, as is often the case, the diaphragm is to be partially inverted or tilted into a perpendicular position, as shown in fig. 2 of the drawings, which allows of the free passage of the liquid through the instrument, but not through the diaphragm.

It will be apparent that the periphery of the case of the diaphragm, when horizontal or at right angles to the axis of the case, tightly fills the chamber *c*, thus preventing passage of water through the instrument, except it is compelled to pass through the diaphragm, which thus becomes its own packing.

When the diaphragm gives out from any cause, and must be renewed, the movable ring *j* is to be detached and a new diaphragm substituted at trifling expense.

Several advantages make themselves manifest in the adoption of my invention:

First, the exceeding low cost is a matter of great importance.

Second, the filter always remains in the same position, and does not require to be detached from its connection and reversed end for end, as in many others, the inversion of the diaphragm obviating this necessity.

Third, the ease and rapidity with which a spent diaphragm may be renewed, and the trifling cost of a fresh one, add another argument to the value of the invention.

I have contemplated producing a cheap style of filter by dispensing with the two cups connected together, as explained, and applying the reversible diaphragm to the interior of a short pipe or cylinder, as shown in fig. 6 of the accompanying drawings.

Claims.

I claim—

1. A filter, in which a reversible rotating diaphragm or strainer is employed, so constructed that the filtering agent serves both as means of filtering the liquid passing through the instrument, and of preventing passage of liquid about the circumferences of such filtering agent, as herein set forth and described.

2. A filter, composed of two cups joined at their circumferences, and provided with a reversible diaphragm or strainer, operated from the outside of the case of the instrument, as herein set forth and described.

3. The combination and arrangement of the two rings $f$ and $j$, shaft $g$, and strainer or diaphragm $i$, when combined with a suitable case, in manner and for the purpose before explained.

TAYLOR P. THOMPSON.

Witnesses:
 FRED. CURTIS,
 EDWARD GRIFFITH.